United States Patent [19]

Camras

[11] 3,864,729

[45] Feb. 4, 1975

[54] VIDEO TRANSDUCING APPARATUS

[75] Inventor: Marvin Camras, Glencoe, Ill.

[73] Assignee: IIT Research Institute, Chicago, Ill.

[22] Filed: Apr. 4, 1973

[21] Appl. No.: 347,689

Related U.S. Application Data

[60] Continuation of Ser. No. 182,211, Sept. 20, 1971, abandoned, which is a division of Ser. No. 34,504, May 4, 1970, Pat. No. 3,705,954, which is a division of Ser. No. 649,256, June 27, 1967, Pat. No. 3,596,008, which is a continuation-in-part of Ser. No. 528,934, Feb. 21, 1966, abandoned.

[52] U.S. Cl. .................................................. 358/4

[51] Int. Cl. .......................... H04n 5/76, H04n 9/02

[58] Field of Search ...................... 358/4; 178/6.6 A

[56] References Cited

UNITED STATES PATENTS 3,320,370 5/1967 Barry ............................ 178/6.6 A

*Primary Examiner*—Richard Murray
*Attorney, Agent, or Firm*—Hill, Gross, Simpson, Van Santen, Steadman, Chiara & Simpson

[57] ABSTRACT

Monochrome and color television recording and playback circuitry for coupling of a video magnetic transducer head with a standard broadcast television receiver. The transducer head preferably includes a plurality of head units for recording respective color television signals with provision for selectively recording a monochrome signal on successive channels with the use of one only of the head units.

3 Claims, 3 Drawing Figures

VIDEO TRANSDUCING APPARATUS

CROSS REFERENCES TO RELATED APPLICATIONS

The present application is a continuation of my co-pending application Ser. No. 182,211 filed Sept. 20, 1971 (now abandoned), which in turn is a division of my application Ser. No. 34,504 filed May 4, 1970 (now U.S. Pat. No. 3,705,954 issued Dec. 12, 1972). Said application Ser. No. 34,504 is a division of my application Ser. No. 649,256 filed June 27, 1967 (now U.S. Pat. No. 3,596,008 issued July 27, 1971). Said application Ser. No. 649,256 is a continuation-in-part of my earlier application Ser. No. 528,934 filed Feb. 21, 1966 abandoned in favor of Ser. No. 62,601 filed Aug. 10, 1970 (now U.S. Pat. No. 3,683,107 dated Aug. 8, 1972). Reference is made under 35 U.S.C. 120 to said applications Ser. Nos. 528,934, 649,256, 34,504, 62,601 and 182,211.

BACKGROUND OF THE INVENTION

An important problem in the magnetic recording art relates to the need for a video transducer apparatus which can be manufactured at a reasonable cost and yet which will provide quality transducing of television signals, and particularly color television signals and the associated audio signals.

SUMMARY OF THE INVENTION

This invention relates to a wide band transducing system and method, and particularly to a system for recording and/or reproducing black and white and color television signals.

In a preferred embodiment of the present invention three demodulated signals from a conventional color television receiver are coupled to respective video transducer head units for recording on respective channels during a color image recording operation, means being provided for selectively rendering all but one head unit inoperative during a monochrome signal recording operation and for supplying the monochrome signal containing luminance information to the remaining one of the head units for selectively recording the monochrome signal selectively on each of the respective channels during the monochrome signal recording operation.

It is an object of the present invention to provide an economical television, transducing system such as would be particularly suitable for home or educational uses.

Identification of Nonessential Material Incorporated Herein For Purposes Of Indicating The Background Of The Invention The disclosure of the present invention set forth hereinafter is taken from the disclosure relating to FIGS. 1-3 and 11 of my U.S. Pat. No. 3,683,107 issued Aug. 8, 1972, and reference is hereby made to the remaining portions of the disclosure physically present in said U.S. patent as comprising nonessential subject matter for purposes of indicating the background of the invention.

DESCRIPTION OF THE PREFERRED EMBODIMENT

Figure 1:
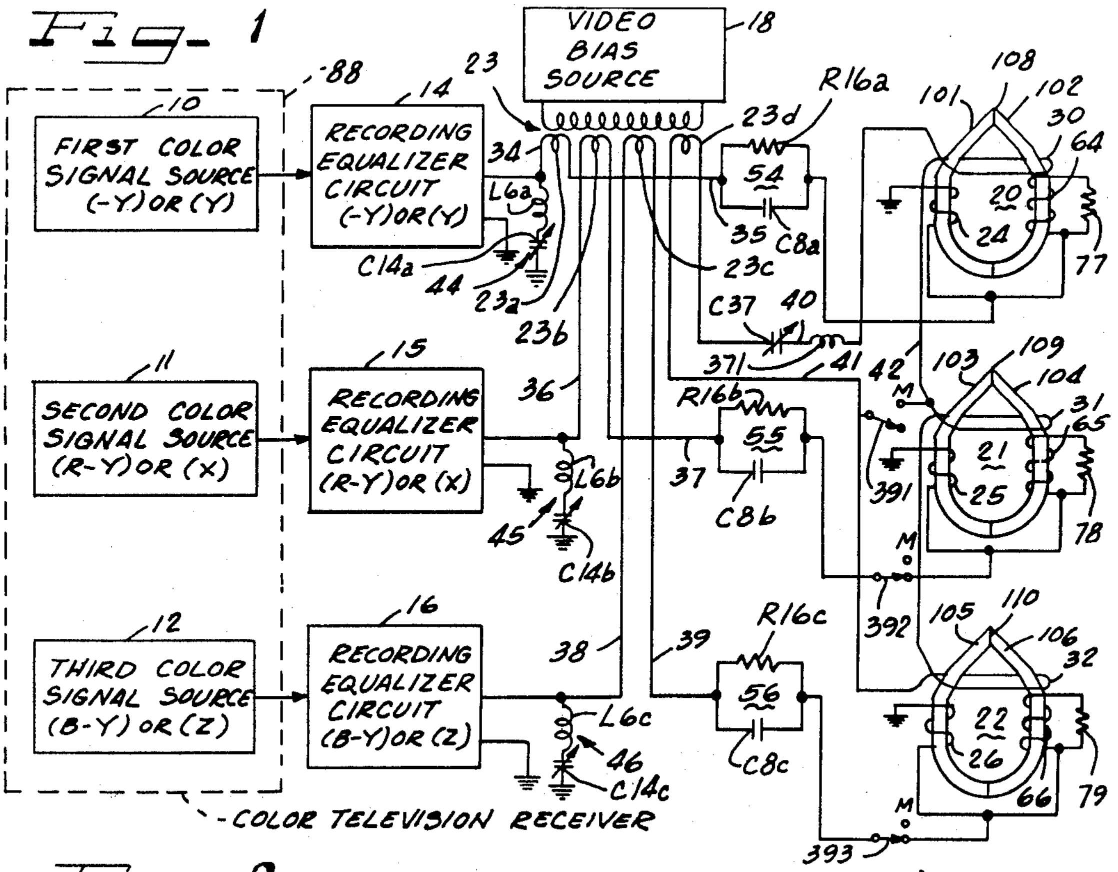
FIG. 1 is a diagrammatic view indicating a preferred color television recording system in accordance with the present invention.

FIG. 1 illustrates in diagrammatic form a preferred color television recording system in accordance with the present invention. In this preferred system, demodulated color signals are obtained from suitable sources such as indicated at 10, 11 and 12. In one type of commercial broadcast receiver, as for example the RCA CTC16XH chassis, demodulated signals known as the minus Y(−Y) signal, the R minus Y( R−Y) signal and the B minus Y(B−Y) signal may be obtained, respectively from the plate of a third video amplifier tube, from the plate of a R minus Y amplifier tube and from the plate of a B minus Y amplifier tube. In general the (−Y) signal may be obtained from the cathode drive of commonly used three green color picture kinescopes, the (R-Y) signal from the red grid drive, and the (B-Y) signal from the blue grid drive. Alternatively, the undelayed (−Y) signal is obtained from the first video amplifier. Alternatively, suitable demodulated color components known as the Y signal, the X signal and the Z signal may be obtained from the grids of the monochrome amplifier and the color amplifier tubes respectively, and the color signal sources 10, 11 and 12 may represent suitable sources of these signals in such receiver circuitry, as another example. The term "color television signal" as utilized herein refers to a signal which may be utilized in reconstructing a color image without regard to whether the signal represents the actual variation of intensity of a particular color component of a light image. Thus, the term "color television signal" as utilized herein comprehends the conventional Y or (−Y) signal which is found in present receiver circuitry.

Recording circuitry components 14–16 may comprise suitable equalizer circuits and optionally may include amplification circuitry.

In the preferred circuit arrangement, a component 18 is included for supplying a high frequency bias current to the respective head units indicated at 20, 21 and 22. By way of specific example, the source 18 has been indicated as energizing a transformer 23 which has respective secondary windings **23*a*, 23*b* 23*c* interposed in series between the respective recording circuits 14–16 and the respective record windings 24, 25 and 26 of the head units. The video bias source 18 is also illustrated as energizing cross field conductors 30, 31 and 32 in series by means of a secondary winding 23*d*.**

Figure 2:
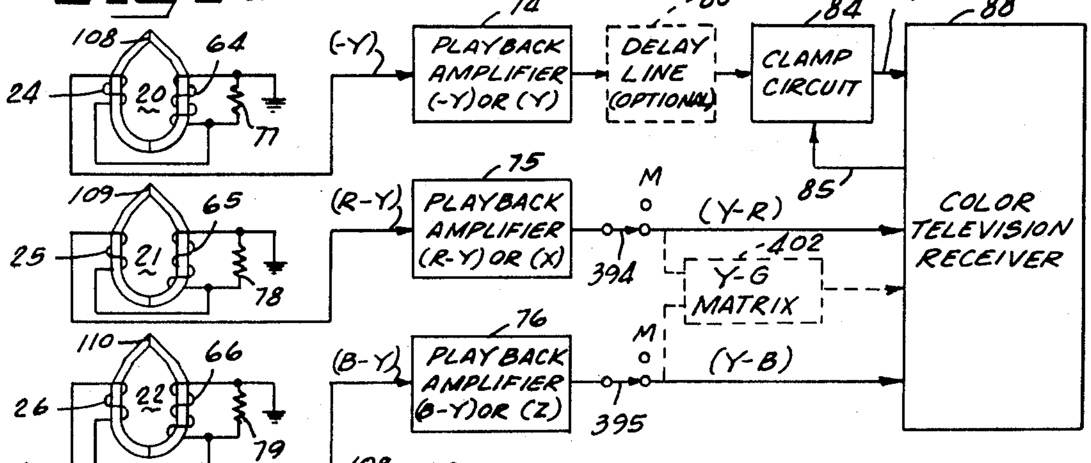
FIG. 2 is a diagrammatic illustration of a preferred color television playback system in accordance with the present invention.

FIG. 2 illustrates a preferred playback arrangement including head units 20–22 which are identical to the head units of FIG. 1. During playback, the low impedance windings 24–26 are connected in series with high impedance windings 64–66 to supply respective reproduced signals to playback amplifiers 74–76. Resistors 77–79 are connected in parallel with the high impedance windings 64–66 and are for the purpose of dampening any resonance effects in the high impedance coil associated therewith. The input impedance of components 74, 75, 76 are designed to further damp the resonances in heads 20, 21 and 22.

As indicated in FIG. 2, the reproduced signals may represent respective demodulated color signal components such as a (−Y) component, a R minus Y component and a B minus Y component or may represent Y, X and Z components as previously mentioned, for example. A delay line component 80 may be optionally provided in the Y channel, the delay line in the monochrome portion of the broadcast receiver being conveniently used. The three color component signals may be supplied to suitable points in a conventional color television receiver circuit, for example to the grid of a first video amplifier tube, to the grid of a R minus Y amplifier tube and to the grid of a B minus Y amplifier tube, respectively, where these are the signals normally present in such receiver circuitry. In the RCA CTC 16XH the delay line in the monochrome circuit may be bypassed by supplying the (−Y) playback signal to the third video amplifier V708, and similarly the delay line may be bypassed in other receivers.

Figure 3:
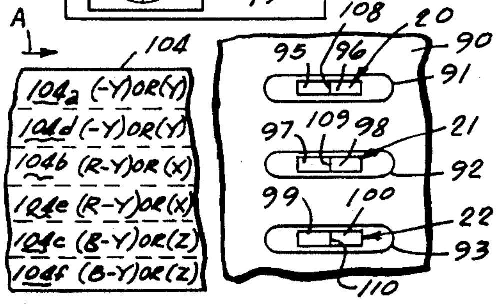
FIG. 3 is a diagrammatic partial plan view illustrating a preferrred transducer system for recording and playback of color television signals.

For simplicity, the head units 20–22 may have the same width as actually illustrated in the drawings, so record tracks on the record medium 104 of equal width. As indicated in FIG. 3 the head units 20, 21 and 22 may be spaced apart in the lateral direction by multiples of the channel width so that the upper set of alternate channels 104*a* -104*c* receive signals (minus Y), (R minus Y) and (B minus Y) respectively as the tape 104 travels in the direction of arrow A, and the lower set of alternate channels 104*d*–104*f* receive signals (minus Y), (R minus Y) and (B minus Y) as the tape moves in the opposite direction.

As indicated in FIG. 1 only one clamp circuit is provided in the recorder, and this is preferably associated with the output of the monochrome playback amplifier 74. With this arrangement, it will be apparent that the system of FIGS. 1 and 2 may be utilized to record and playback monochrome broadcast television signals as well as color signals. This takes place automatically when recording while the TV set is picking up a monochrome signal. By switching out the heads 21 and 22 during recording and playback, and setting the (−Y) head 20 to cover successive channels including those which would otherwise be used by the color signals, more recording time is obtained on a given roll of tape.

As previously mentioned, the system of FIGS. 1 and 2 may be utilized for recording broadcasts of monochrome signals. In this event it is advantageous to disable the color signal head units 21 and 22. Referring to FIG. 1, a first disabling switch 391 is indicated which in its upper monochrome position serves to by-pass cross field windings 31 and 32. Further switches 392 and 393 disconnect the signal windings of head units 21 and 22 so that the superimposed signal and bias current will not reach the head units 21 and 22. In FIG. 2, switches 394 and 395 may be utilized for disconnecting playback head units 21 and 22 during playback of a monochrome signal which may be recorded successive channels such as the six channels shown in FIG. 3. The switches 391–395 may be ganged for conjoint operation between their lower and upper positions and may be arranged for manual actuation.

FIG. 11 shows details of a preferred head mounting assembly. The reference numeral 454 designates generally a head positioning device similar to that disclosed in my copending application U.S. Ser. No. 493,271.

For the head arrangement illustrated in FIG. 3, one rotation of the index knob 477 would serve to shift the head assembly by a distance corresponding to the center to center spacing between successive channels such as 104*a* and 104*d*. The thread pitch preferably would be selected so that one rotation of the knob 477 would index the head units between successive channels. Thus, if the center to center spacing between the head units as view in FIG. 3 were 88.5 mils. one rotation of the index knob 477 would shift the head units one-half of this distance, referring to the head arrangement of FIG. 3. Other suitable head indexing arrangements are illustrated in my copending applications Ser. Nos. 401,832 and 456,192.

I claim as my invention:

1. A color television recording system comprising
receiver circuitry for supplying respective color television signals,
a video transducer head for coupling to a record medium to record the respective color television signals on the record medium, and
coupling means connected to said receiver circuitry and to said transducer head for transmitting the respective color television signals to said transducer head during recording.
said transducer head comprising at least two video head units scanning respective first and second channels of a record medium for recording respective color television signals containing information relative to a color image on said channels during a color image recording operation,
means for selectively rendering one of said head units inoperative during a monochrome signal recording operation and for supplying a monochrome signal containing luminance information to the other of said head units, and
means for selectively recording a monochrome signal on each of said first and second channels during the monochrome signal recording operation.

2. The system of claim 1 with
means for shifting said other of said head units to register selectively with said first and second channels during said monochrome recording operation.

3. The system of claim 1 with
means for recording audio signals related to said monochrome signal selectively in said first and second channels during said monochrome signal recording operation.

* * * * *